L. D. DANA.
Friction-Clutch.

No. 205,362. Patented June 25, 1878.

Witnesses
Otto Hufeland
Hugo Brueggemann

Inventor.
Lester D. Dana
by
Van Santvoord & Hauff
Attys.

UNITED STATES PATENT OFFICE.

LESTER D. DANA, OF WAUPACA, WISCONSIN.

IMPROVEMENT IN FRICTION-CLUTCHES.

Specification forming part of Letters Patent No. 205,362, dated June 25, 1878; application filed May 14, 1878.

*To all whom it may concern:*

Be it known that I, LESTER D. DANA, of Waupaca, in the county of Waupaca and State of Wisconsin, have invented a new and useful Improvement in Friction - Clutches, which improvement is fully set forth in the following specification, reference being had to the accompanying drawing, in which—

Figure 1:
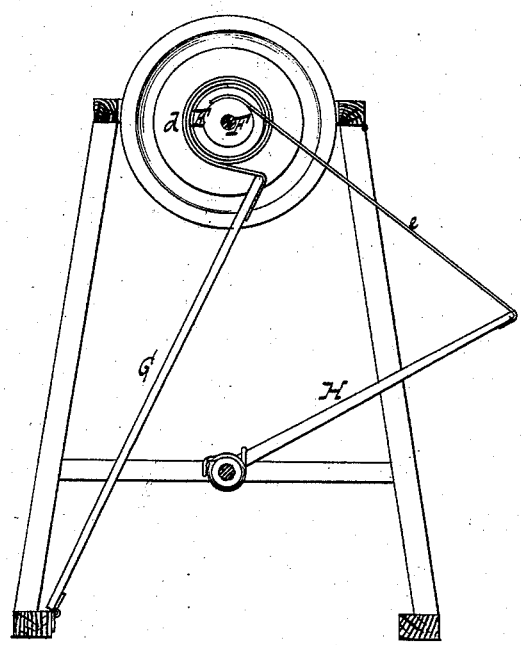
Figure 2:
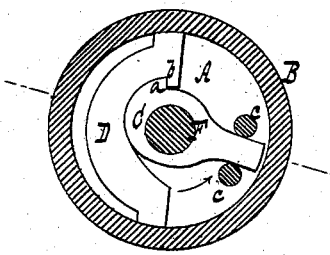
Figure 3:
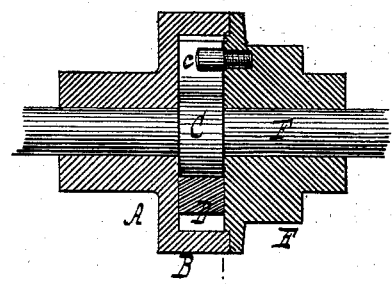

Figure 1 represents a vertical cross-section of a foot-power containing my invention. Fig. 2 is a cross-section of the clutch detached. Fig. 3 is a longitudinal section thereof.

Similar letters indicate corresponding parts.

My invention relates especially to that class of clutches used on foot-powers; and it consists in the combination of a flanged revolving disk secured on the shaft to be driven, a dog or cam mounted loosely on said shaft within the flanged revolving disk, a segment bearing on the flange of the revolving disk and engaging with said dog or cam, and an oscillating disk, which is mounted loosely on the shaft and engages with said dog or cam, in such a manner that when the oscillating disk is turned in one direction the segment is jammed against the flanged revolving disk, and the latter, together with the shaft, is caused to partake of its motion, while, when the oscillating disk is turned in the other direction, the segment is loosened, and the flanged revolving disk is permitted to continue its revolving motion.

In the drawing, the letter A designates the body, and B is the flange, of the revolving disk. C is the dog or cam, D is the segment, and E is the oscillating disk, of my clutch.

The letter F designates the machine-shaft to which motion is to be imparted. I secure the disk A on this shaft F in any suitable manner, and mount the dog or cam C on the shaft within said disk, the segment D being also situated within the disk.

The segment D bears on the inner surface of the flange B at its opposite ends, and the inner edge of said segment is eccentric to the axis of the disk A, while the dog C bears against such eccentric edge of the segment. The dog C, moreover, is provided with a toe, $a$, which engages with a toe, $b$, projecting inwardly from the segment D.

The oscillating disk E is mounted loosely on the shaft F adjacent to the disk A, and it is provided with one or two pins, $c$, on the side facing the disk A, whereby it engages with the dog C, as shown.

When the oscillating disk E is turned in the direction of the arrow seen in Fig. 2, the dog C is pressed against the segment D, and the latter is wedged against the flange B of the fixed disk A, so that the latter is caused to move with the oscillating disk, or, in other words, a revolving motion is imparted thereto and to the shaft. If the motion of the oscillating disk E is now reversed, the segment is freed, and the disk A is allowed to continue its revolving motion, while the segment at the same time is caught by the toe $a$, and is caused to move back, together with the dog C and the oscillating disk.

My clutch can be used to advantage on a foot-power constructed as shown in Fig. 2, and which consists of a strap, $e$, which is alternately wound on and off a hub formed on the oscillating disk E by the action of a treadle, G, and a spring-bar, H, to which latter is connected a secondary strap, $d$, which also is wound on and off the oscillating disk E at a point adjacent to the main strap.

What I claim as new, and desire to secure by Letters Patent, is—

In a clutch, the combination of the flanged revolving disk A, secured on the shaft F, a dog or cam, C, provided with a toe, $a$, and mounted loosely upon said shaft within the flanged disk, a segment, D, provided with toe $b$, and arranged also within said flanged disk, so as to engage with the said dog or cam, and an oscillating disk, E, mounted loosely upon the shaft and engaging with said dog, all adapted to operate substantially as described.

In testimony that I claim the foregoing I have hereunto set my hand and seal this 7th day of May, 1878.

LESTER D. DANA. [L. S.]

Witnesses:
FRANCIS D. RANDALL,
J. B. SIMCOCK.